(No Model.) 7 Sheets—Sheet 2.

J. SCHUCHAT & D. G. BUTTS.
MACHINE FOR MAKING TUFTS.

No. 570,685. Patented Nov. 3, 1896.

Fig. 2

Witnesses
Clinton Hamluck
John W. Adams

Inventors
Jonas Schuchat and Daniel G. Butts
by Dayton Poole & Brown
his Attorneys

THE NORRIS PETERS CO., PHOTO-LITHO., WASHINGTON, D. C.

(No Model.) 7 Sheets—Sheet 3.

J. SCHUCHAT & D. G. BUTTS.
MACHINE FOR MAKING TUFTS.

No. 570,685. Patented Nov. 3, 1896.

Fig. 3

Witnesses
Clinton Hamlink
John W. Adams.

Inventors
Jonas Schuchat
Daniel G. Butts
by Dayton Poole & Brown
his Attorneys (No Model.) 7 Sheets—Sheet 4.

J. SCHUCHAT & D. G. BUTTS.
MACHINE FOR MAKING TUFTS.

No. 570,685. Patented Nov. 3, 1896.

Fig. 4

Witnesses
Clinton Hamlink
John W. Adams

Inventors
Jonas Schuchat
Daniel G. Butts
by Dayton Poole & Brown
his Attorneys

(No Model.) 7 Sheets—Sheet 5.

J. SCHUCHAT & D. G. BUTTS.
MACHINE FOR MAKING TUFTS.

No. 570,685. Patented Nov. 3, 1896.

(No Model.) 7 Sheets—Sheet 6.

J. SCHUCHAT & D. G. BUTTS.
MACHINE FOR MAKING TUFTS.

No. 570,685. Patented Nov. 3, 1896.

Witnesses
Clinton Hamlink
John W. Adams

Inventors
Jonas Schuchat
Daniel G. Butts
By Dayton Poole Brown
his Attys

(No Model.) 7 Sheets—Sheet 7.

J. SCHUCHAT & D. G. BUTTS.
MACHINE FOR MAKING TUFTS.

No. 570,685. Patented Nov. 3, 1896.

Witnesses
Clinton Hamlink
John W. Adams

Inventors
Jonas Schuchat
Daniel G. Butts
by Dayton Pooles Brown
his Attorneys

UNITED STATES PATENT OFFICE.

JONAS SCHUCHAT AND DANIEL G. BUTTS, OF CHICAGO, ILLINOIS; SAID BUTTS ASSIGNOR TO SAID SCHUCHAT.

MACHINE FOR MAKING TUFTS.

SPECIFICATION forming part of Letters Patent No. 570,685, dated November 3, 1896.

Application filed June 29, 1895. Serial No. 554,498. (No model.)

*To all whom it may concern:*

Be it known that we, JONAS SCHUCHAT and DANIEL G. BUTTS, residents of Chicago, in the county of Cook and State of Illinois, have invented certain new and useful Improvements in Machines for Making Tufts; and we do hereby declare that the following is a full, clear, and exact description thereof, reference being had to the accompanying drawings and to the letters of reference marked thereon, which form a part of this specification.

This invention relates to a machine for forming tufts used in tying or sewing mattresses or other stuffed or padded articles, the purposes of the tuft being to form a cushion or bearing which prevents the thread from cutting or tearing through the mattress-covering between stitches, thus enabling the opposite sides or ends of the mattress or other article to be drawn more closely together upon the interposed padding material without injury to the fabric, to form a cover which conceals and protects the stitches and knotted ends of the tying-thread, and to form an ornament which enhances the general appearance of the article.

The present machine is adapted to form a tuft from yarn or cord by first forming a plurality of parallel coils or loops of the yarn and thereafter binding the coils together and tying them into a compact bunch or tuft ready for application.

The object of the invention is to provide a simple, practical machine which will automatically form from a continuous strand of yarn and deliver in completed form tufts similar to those heretofore produced by hand-labor.

The invention consists in the matters hereinafter described, and more particularly pointed out in the appended claims, and the same will be readily understood from the following description, reference being had to the accompanying drawings, which illustrate one practical and preferred form of embodying the invention.

In said drawings,
Fig. 6 is a top plan of the same.
Figs. 7 and 8 are end elevations of the adjacent ends of the right and left hand parts, respectively, of the winding-head.
Fig. 16 is a detail of the connected pair of sliding bolts.
Fig. 17 is a transverse sectional view of the winding-head, taken on line 17 17 of Fig. 5 and showing the arrangement of the spring-pressed bolt-catches.
Fig. 18 is an end view of the part of the winding-head which carries the cutter-blade and gripping-bolt, showing the relative position of the parts at the time the needle has reached the end of its inward stroke.

Figure 14:
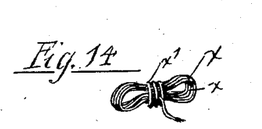
Fig. 14 is a perspective of a completed tuft.

The tuft X, produced by the particular machine described herein, is composed of a plurality of coils $x$, laid parallel with each other in the form of a minute skein and bound together by winding one end of the yarn transversely around the middle of the skein several times, as at $x'$, and thereafter fastening the end of the yarn, so as to prevent unwinding. A machine adapted to form such a tuft, therefore, comprises a holder upon which the skein or parallel coils are first wound, mechanism for winding the yarn upon the holder, mechanism for thereafter rotating the skein bodily about its longitudinal axis, or for otherwise winding the yarn transversely about the middle of the skein, and mechanism for cutting off the tuft from the supply end of the yarn and fastening the severed end to prevent the tuft from becoming unwound. The present embodiment of these general features embraces a main frame, upon which is revolubly mounted an elongated divided winding-head, provided with parallel skein-holding studs, which project radially from the head, one at each side of the line of division thereof. A rectangular frame carrying a tubular thread-guide is mounted upon a pair of eccentrics alongside of the head, so as to carry the thread-guide in an orbit around the said studs and then wind the skein thereon. The thread-guide is then held stationary, while the winding-head is rotated by suitable mechanism upon its own axis, thus winding the strand transversely upon the skein through the opening of the head. A needle of peculiar construction mounted upon a swinging frame which approaches and recedes from the winding-head in a direction transverse to the arm of the latter now comes forward, pierces the tuft, engages the thread at a point between the adjacent ends of the divided head and at the rear of the tuft, and in its return movement draws the thread across a knife, severs it, and draws the end through the tuft. An ejector follows the needle in its return movement and pushes the completed tuft from the studs.

Referring to the drawings, A designates, as a whole, the main frame of the machine, comprising two end uprights $A' A^2$, made in skeleton form and provided with suitable integral cross-bars $A^3 A^4 A^5$, which insure sufficient strength and rigidity in the standards and also afford proper support for various parts of the mechanism.

$A^6 A^7$ and $A^8 A^9$, respectively, designate longitudinal front and back bars, which extend between the end standards and form, in conjunction with the latter, a frame of generally oblong rectangular form.

The upper ends of the end standards $A' A^2$ are formed with sloping surfaces $a\ a$, inclined upwardly and rearwardly from the front to the central part of the machine, and upon these inclined surfaces is secured a spool-table B.

Figure 1:
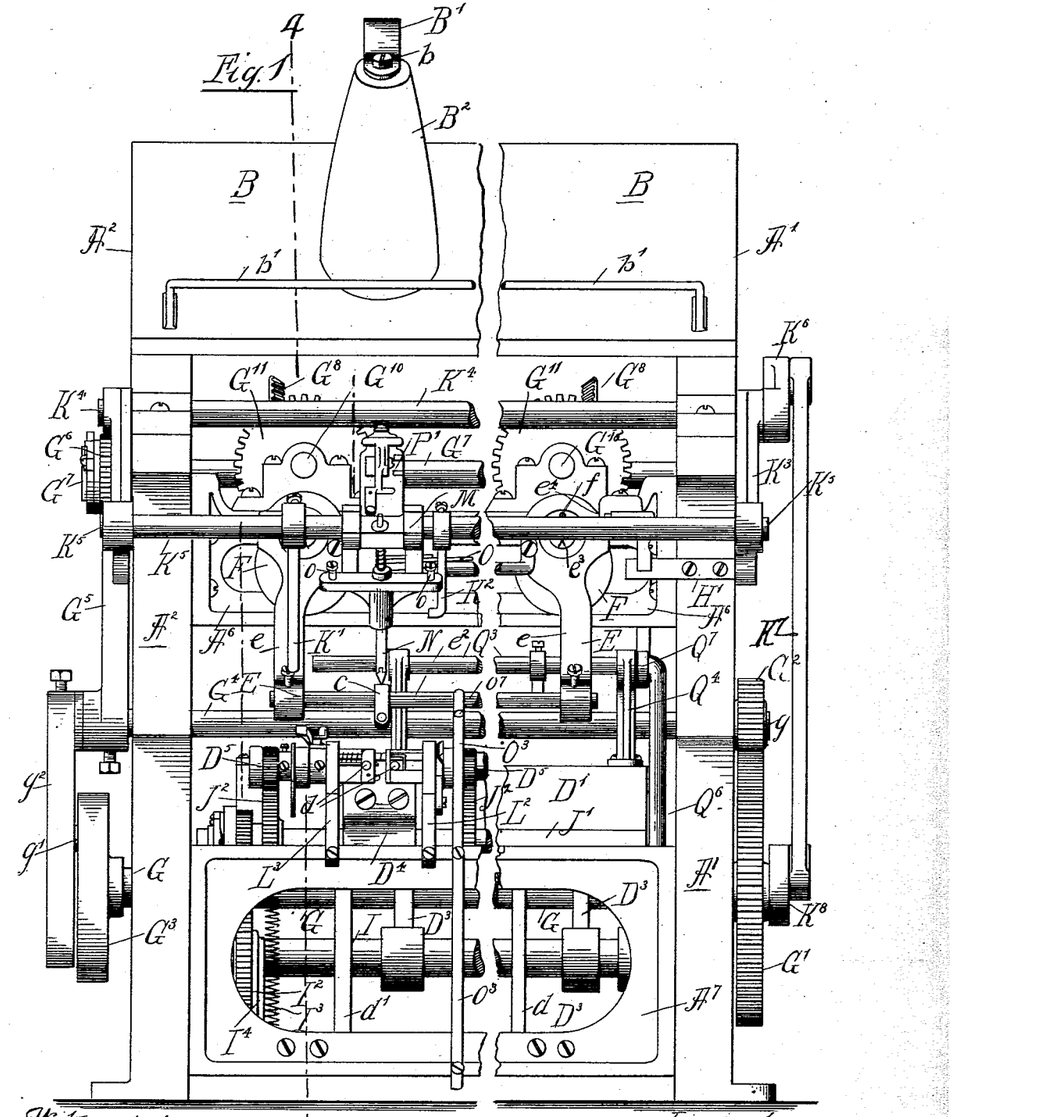
Figure 1 is a front elevation of a machine embodying our invention.

B' designates a suitable bracket-arm supporting the upper end of a removable spindle $b$, the lower end of which engages a suitable socket in the table B, and upon which is revolubly mounted the spool of yarn $B^2$. From the spool $B^2$ the yarn is carried forward over a guide-bar $b'$, thence down through a tubular guide C, mounted upon a frame E, and thence to the tuft-forming devices located lower down in the central front part of the machine, as shown in front elevation in Fig. 1.

The frame E has a rotary movement in a vertical plane parallel with the front side of the machine so as to carry the tubular guide C thereon in a circular path around a pair of horizontal forwardly-projecting studs $d\ d$, (shown in detail Figs. 5 to 8,) mounted upon a horizontal longitudinally-arranged head D, upon which studs the minute skein is wound. The tubular guide C is mounted upon a rigid generally rectangular-shaped frame E, comprising vertical end bars $e\ e$ and horizontal top and bottom bars $e'\ e^2$, respectively, all suitably secured together. The upper ends of the end bars $e\ e$ are provided with bearing-apertures $e^3\ e^3$, which engage wrist-pins $f\ f$, mounted eccentrically upon disks F F, carried upon the forward ends of transversely-arranged uniformly-driven shafts $F'\ F'$, thereby imparting to the frame E and guide C carried thereby the required rotary movement in a vertical plane.

Figure 2:
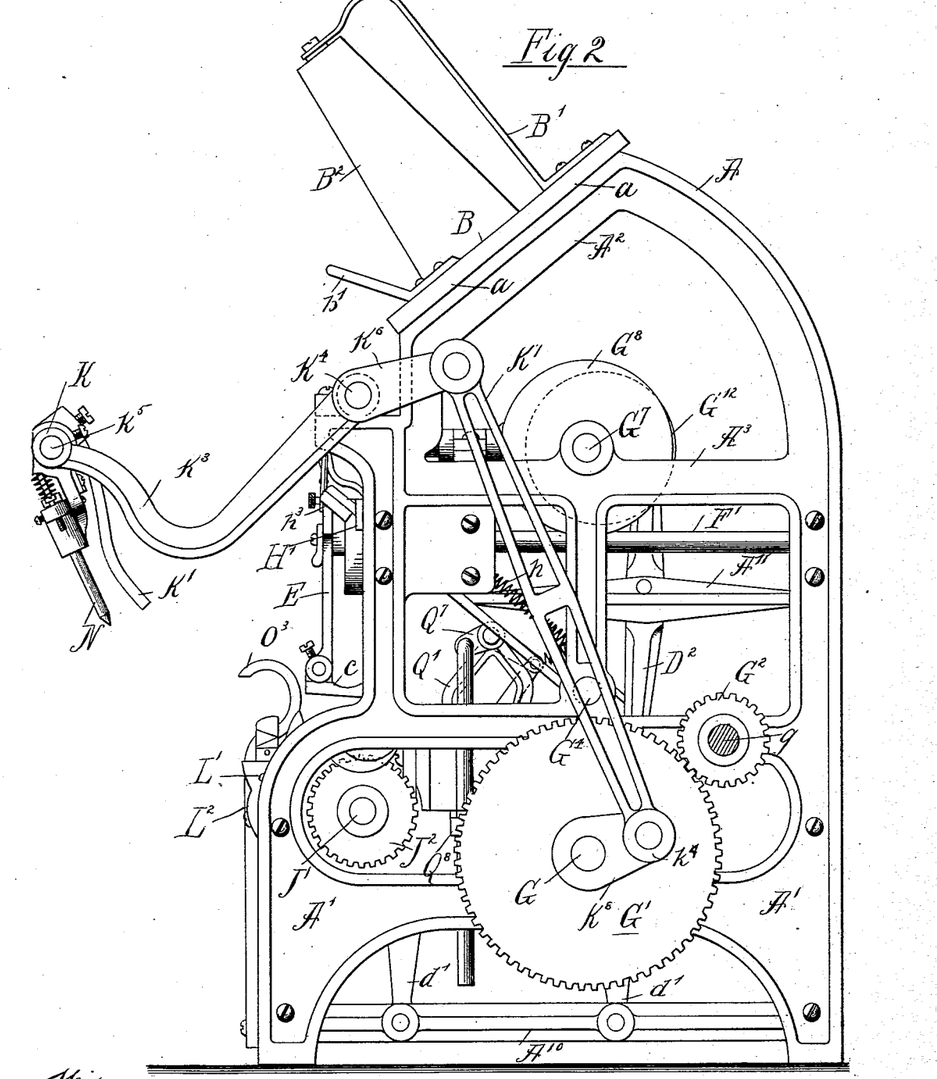
Fig. 2 is a right-hand end elevation of the same.
Figure 3:
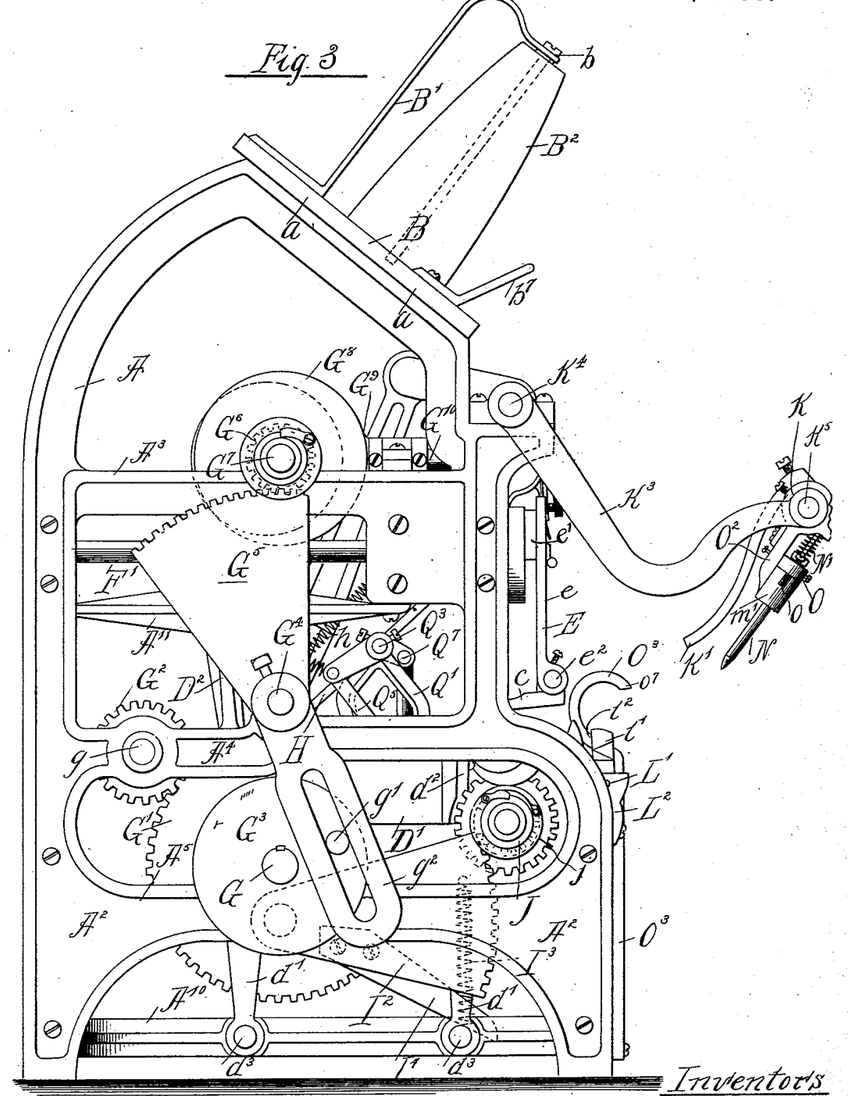
Fig. 3 is a left-hand end elevation.
Figure 4:
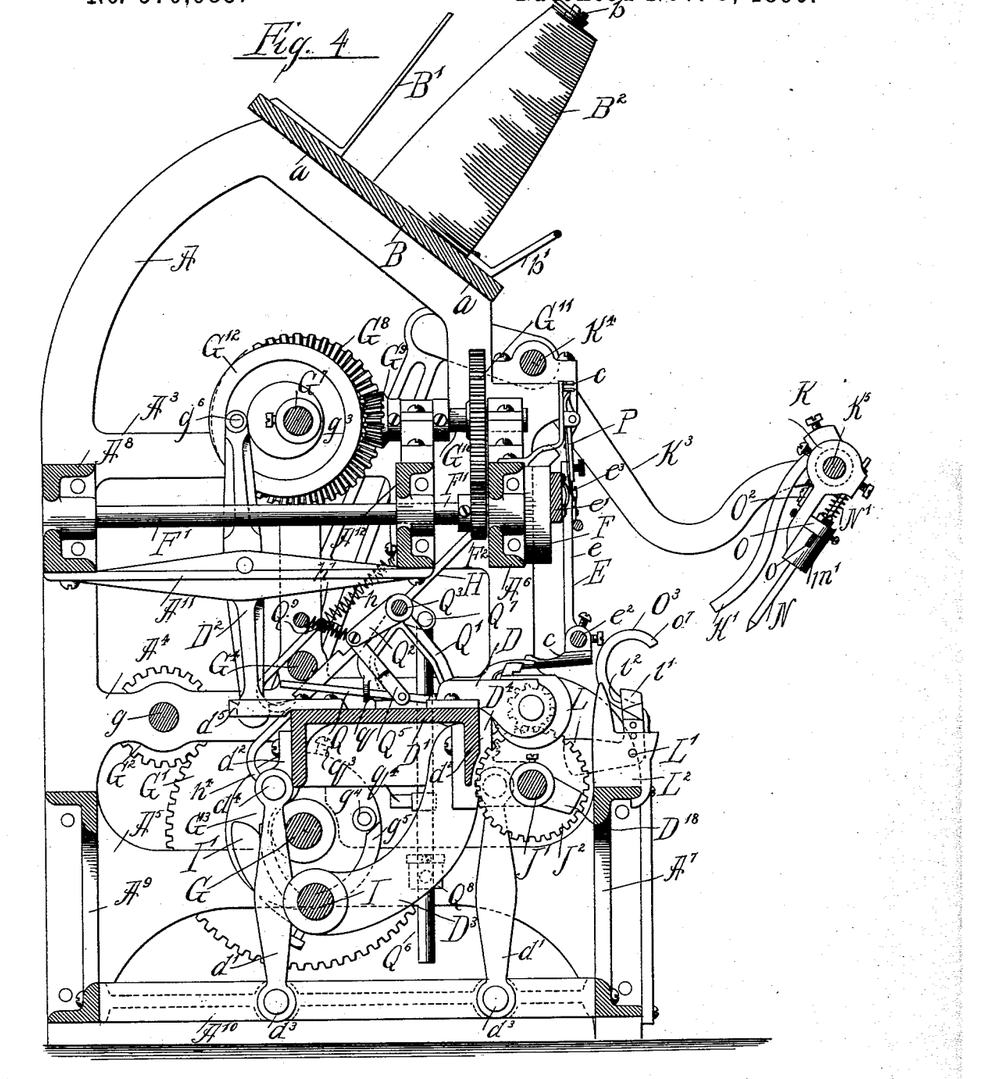
Fig. 4 is a transverse vertical sectional view taken on line 4 4 of Fig. 1 and looking in the direction of the arrows.
Figure 5:
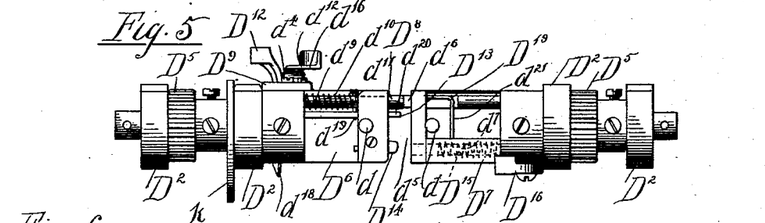
Fig. 5 is a full-sized detail side elevation of the tuft-winding head.

Motion is transmitted to the shafts $F'\ F'$ as follows: Referring to Fig. 2, G designates the main driving-shaft of the machine, journaled in suitable bearings in the main frame A, so as to extend lengthwise of the machine in the lower central part thereof, and provided at its right-hand end, exterior to the end standard $A'$, with a fixed gear-wheel $G'$. $G^2$ indicates a driving-pinion mounted on any suitably-driven shaft $g$, arranged to intermesh with and drive the gear $G'$. Upon the extreme other end of the shaft G, exterior to the end standard $A^2$, is rigidly keyed a disk $G^3$, which is provided with a cam-stud $g'$. $G^4$ designates a rock-shaft mounted in the frame A above and parallel with the main driving-shaft G, upon which shaft $G^4$ is rigidly secured a segment $G^5$, provided with a slotted tail piece $g^2$, which embraces the cam-stud $g'$ and in the rotation of the disk $G^3$ imparts an oscillatory movement to said segment. The segment $G^5$ meshes in turn with a ratchet-gear $G^6$, having ratchet engagement with a counter-shaft $G^7$, the arrangement being such that the counter-shaft $G^7$ has an intermittent rotation in one direction. Upon the shaft $G^7$ are fixed two miter-gears $G^8\ G^8$, which are arranged to intermesh with smaller beveled gears $G^9\ G^9$, fixed upon transversely-arranged shafts $G^{10}\ G^{10}$, which extend forwardly and carry near their front ends gears $G^{11}\ G^{11}$. The gears $G^{11}$ mesh with and drive smaller gears $F^2\ F^2$, mounted upon the shafts $F'\ F'$. Obviously the train of gearing described will multiply the rotation of the shaft $G^7$, the proportion herein shown being such that the shafts $F'$ will be turned ten revolutions to one of the shaft $G^7$.

In order that the several coils of the skein may be properly distributed upon the studs $d\ d$ during the winding thereof, the head D, from which said studs $d\ d$ project, is mounted upon a frame $D'$, which frame, together with various parts of the driving mechanism by means of which the head D is rotated, is arranged to make a single short backward and forward reciprocation during the winding of the coils, thus varying the relation of the studs $d\ d$ to the tubular guide C and causing the coils to be distributed lengthwise upon the studs. The mechanism whereby this reciprocation is accomplished is arranged as follows:

$d'$ $d'$ $d'$ $d'$ designate four vertically-disposed toggles, two at each end of the machine, pivoted at their lower ends upon cross-frames $A^{10}$ $A^{10}$. The frame $D'$, which is shown in the form of a casting of oblong rectangular form in plan and of inverted channel shape in cross-section, is mounted upon the upper ends of the toggles $d'$, by means of front and rear brackets $d^2$, bolted upon the sides of the frame $D'$ and provided with pivot-studs $d^4$, which engage pivot-eyes in the upper ends of the toggles.

$D^2$ $D^2$ designate two levers pivotally mounted between their ends upon transverse frame-bars $A^{11}$ $A^{11}$ and engage at their lower ends with brackets $d^5$ $d^5$, extending out from the rear side of the frame $D'$ by means of flexible connections, permitting slight endwise movement of the levers relative to the frame $D'$. The upper ends of said levers $D^2$ are provided with cam-studs $g^6$ $g^6$, which engage circular eccentrically-arranged cam-grooves $g^3$ $g^3$, formed in cam-disks $G^{12}$, keyed upon the shaft $G^7$. Inasmuch as the said shaft $G^7$ makes but a single revolution upon each oscillation of the segment $G^5$ it will be obvious that the frame $D'$ and head $D$, carried thereby, will be reciprocated back and forth a single time during the winding of the parallel coils of each tuft $X$.

Upon the completion of the winding of the skein upon the studs $d$ $d$ it is necessary that the frame $E$ and tubular guide $C$ be positively arrested and held in proper relation to the head $D$ during the succeeding winding and finishing operations performed on the tuft, and to this end a sliding bar $H$ is arranged to be moved transversely into the path of the rotating frame $E$ at the proper time and in such manner as to form a stop against which the end of the frame strikes and whereby it is arrested and held in the proper position. The bar $H$ is herein shown as being bent upon itself and arranged to embrace and slide at its lower part transversely upon the rock-shaft $G^4$ and as extending thence obliquely upward and forward adjacent to the path of the frame $E$ at a point near the right-hand limit of movement of the latter, the upper part of the bar being arranged to slide through a bracket-support $H'$, secured upon the end standard $A'$, as shown more clearly in detail Fig. 15.

Figure 15:
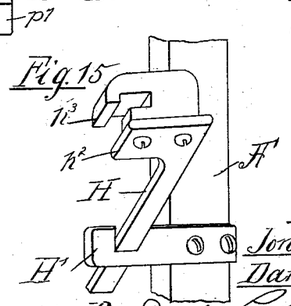
Fig. 15 is a detail perspective of the upper forward end of the sliding stop-bar and the support therefor.
Figure 19:
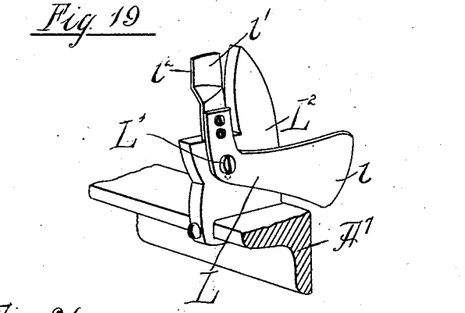
Fig. 19 is a perspective of the bolt-retracting lever and a portion of its support.
Figures 20, 21, 22, 23:
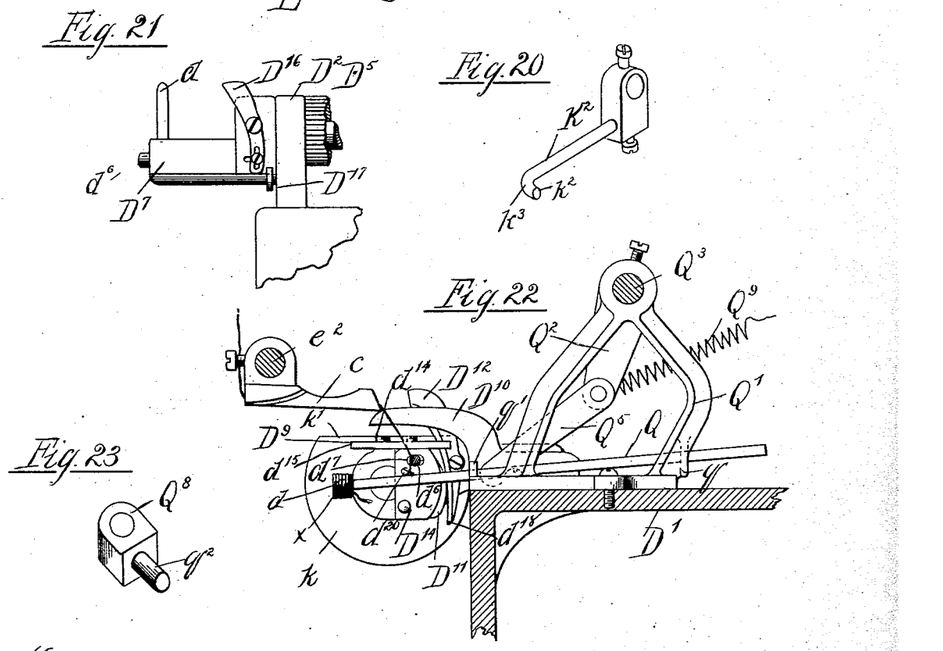
Fig. 20 is a detail of the hooked arm which coöperates with the resilient blade of the lever shown in Fig. 19.
Fig. 21 is a bottom plan view of one part of winding-head, showing the arrangement of the lever, which is acted on by the cam-surface of the lever shown in Fig. 19.
Fig. 22 is a detail showing the relative arrangement of the ejector and winding-head.
Fig. 23 is a perspective of the thimble or bearing through which the operating-rod of the ejector extends.

The bar $H$ is held normally at the upper limit of its movement by means of a coiled contractile spring $h$, secured at one end to the bar, as at $h'$, and at its other to a longitudinally-arranged frame-bar $A^{12}$, the shape of the upper end of said bar being such that when in its uppermost position the end of the frame $E$ will pass beneath and slightly beyond the bar without striking the same, as shown clearly in said detail Fig. 15. At its extreme end, however, the bar $H$ is provided with a widened portion forming a shoulder $h^2$, against which the end $e$ of the frame $E$ strikes when the bar is drawn down, and also with a block provided with a hook or overhanging rib $h^3$, which enters and slides within a corresponding notch $e^4$ in the said frame $E$ in the further downward movement of the sliding bar, thereby locking the frame positively against movement in either direction. The said bar $H$ is retracted or drawn down against the action of the spring $h$ by means of a cam-roller $g^4$, mounted on a disk $G^{13}$, carried by the main driving-shaft $G$, which roller engages a depending hooked part $h^4$ of the bar $H$ and carries it back throughout a part of the revolution of the disk $G^{13}$, finally slipping out of engagement with the end of the bar and permitting it to be thrown back to its normal upper position. The longitudinal coils of the tuft having been wound upon the studs $d$ $d$ and the frame $E$ locked with the tubular guide $C$ in proper position, the next movement of the machine is to rotate the head $D$ bodily upon its own longitudinal axis and thus pass the yarn transversely around the middle of the tuft a number of times.

The head $D$ is rotatably mounted in suitable bracket-bearings $D^2$ $D^2$, mounted upon and extending out from the front side of the frame $D'$, and is driven from the main shaft by connections arranged as follows:

$I$ designates a rock-shaft mounted in suitable bearings in brackets $D^3$ $D^3$, which depend from the frame $D^1$, said shaft being arranged to extend parallel with and immediately below the main shaft $G$. Upon the rock-shaft $I$ is keyed a cam-arm $I'$, arranged to be oscillated by the cam-roller $g^4$ and a cam-flange $g^5$, which extends from the cam-roller in a somewhat irregular spiral partly around the face of the disk $G^{13}$.

$I^2$ designates a segment keyed upon the other end of the shaft $I$ and arranged to mesh with a ratchet-gear $J$, mounted upon and having ratchet engagement with a counter-shaft $J'$, also mounted in bracket-bearings $D^4$ $D^4$, carried by the frame $D'$. Upon the shaft $J'$ are mounted two gear-wheels $J^2$ $J^2$, which mesh with smaller gears $D^5$ $D^5$, mounted directly upon the opposite ends of the head $D$.

The arrangement of the train of gearing described is such that the head $D$ will be caused to make three revolutions to each oscillation of the segment upwardly, and the latter is arranged to be returned to its normal lower position, when permitted by the rotation of the cam-disk $G^{13}$, by means of a contractile spring $I^3$, suitably secured to the segment and to a part of the main frame immediately below the segment. The ratchet-gear $J$ permits the return of the segment $I$ without actuating the head $D$.

In order that the head $D$ may be positively arrested at the proper point after it has completed its axial rotation, the segment $I^2$ is provided with a rigid arm $I^4$, which is carried up with the segment into position to strike a stop or shoulder $j$, formed on the gear-wheel $J^2$, just as the segment reaches the upper limit of its movement.

To now describe in detail the construction of the head D. This is necessarily divided transversely, that is to say, it is of two-part construction, in order that the yarn may pass through and be wrapped around the tuft without including also the body of the head. The two main parts $D^6$ and $D^7$ are arranged and held in exact axial alinement and in the same relation to each other by means of the gearing connections hereinbefore described, the adjacent ends of the two parts being held at such distance apart as to form a throat or passage $d^5$, which will permit the yarn to pass freely therethrough when unobstructed. Upon the end face of the part $D^7$ is formed a slight projection or boss $d^6$, which is provided in its ends with a crease or V-shaped notch extending horizontally across the end of the stud when the part $D^7$ is in its normal position, as shown in the drawings, and $D^8$ designates a wedge-pointed spring-pressed gripping-bolt mounted to slide longitudinally in the part $D^6$ and adapted to coact with the boss $d^6$ to grip and hold the yarn during certain parts of the winding operation. In order that the thread may not be displaced from between the gripping-bolt and coacting boss by a lateral pull thereon, the bolt is provided with a nib $d^7$, which overlaps the side of the boss $d^6$ when the parts are closed. The bolt $D^8$ is arranged within a suitable bore $d^8$, the central portion of the bolt extending through a recess $d^9$ in the side of the part $D^6$, within which recess and surrounding the bolt is a coiled spring $d^{10}$, arranged to act on a stud $d^{11}$ to normally project the bolt. $d^{12}$ designates a second stud carried by the bolt $D^8$ and projecting out through a slot $d^{13}$. With the end of this stud is engaged the slotted end of a lever $D^9$, pivoted near its middle, as at $d^{14}$, upon the part $D^6$, with its opposite end $d^{15}$ projecting out beyond the periphery of the head, as shown more clearly in Fig. 6.

$D^{10}$ indicates a cam-finger secured on the frame $D'$ with its free end projecting forwardly in position to be engaged by the end $d^{15}$ of the lever $D^9$. The finger $D^{10}$ is provided with a curved cam-surface $d^{16}$, which, acting on the end of the lever $D^9$ in the rotation of the head $D^6$, oscillates the lever and retracts the bolt $D^8$.

$D^{11}$ designates a spring-catch pivoted in a suitable recess in the part $D^6$ in position for its edge to automatically engage a notch $d^{17}$ in the bolt $D^8$ when the latter is in its retracted position. The outer edge of the catch $D^{11}$ (which catch is of flat-plate form and pivoted to oscillate in its own plane) projects beyond the periphery of the head $D^6$ and is adapted to be oscillated on its pivot to release the bolt $D^8$ by means of a lever $D^{12}$, pivoted upon the frame $D^2$ in position for its lower end $d^{18}$ to act upon the catch $D^{11}$ when the head $D^6$ is in its stationary position, or that in which the studs $d\ d$ are horizontal. The tripping-lever $D^{12}$ is provided with an inverted-L-shaped upper end, which is weighted so as to hold the lower end of the lever normally out of the path of the catch $D^{10}$, and said lever is tilted backward to trip the catch by the engagement therewith of the end of a curved arm $K'$, carried by a swinging needle-frame K, presently to be described.

In order that the head D may be rotated to the exact proper position, notwithstanding any slight lost motion due to looseness in the gears or the like, the lower side of the arm $K'$ is flattened and is arranged to engage and pass endwise over a flattened surface $k'$, formed on the periphery of a disk $k$, mounted on the head D, thereby serving to right the head D if not left in the exact proper position by the driving mechanism.

$D^{13}$ designates a knife arranged to slide within a bore $d^{19}$, formed in the head $D^6$, parallel with and immediately beneath the bolt $D^8$. The blade $d^{20}$ of the knife is of triangular form in cross-section, having its edge directed rearwardly, and is connected with the bolt $D^8$, by means of the screw-stud $d^{11}$, so as to move with the bolt, the end of the blade being arranged to protrude from the head $D^6$ when projected a distance substantially equal to that of the said bolt $D^8$.

$D^{14}$ designates a rigid stud or boss projecting from the lower part of the end face of the part $D^6$, adapted to coact with a sliding spring-pressed bolt $D^{15}$, mounted in the part of the head $D^7$ in a manner similar to that of the bolt $D^8$.

$D^{16}$ designates a lever mounted on the part $D^7$ and connected with the bolt $D^{15}$ also in a manner substantially like that of the bolt $D^8$. The bolt $D^{15}$ is adapted to be retracted, however, by means of a bell-crank lever L, mounted upon a horizontal pivot $L'$, carried by a suitable standard $L^2$, rising from the front part of the frame $A^7$, said lever being provided on its lower rearwardly-projecting end with an oblique cam-surface $l$, which, when the head D is in its stationary position and the upper arm of the lever is drawn forward, acts on the projecting end of the lever $D^{16}$ to shift it toward the left against the action of a spring $d^7$, and thus retracts the bolt. The upper arm of the lever L terminates in a resilient blade or spring-strip $l'$, which is arranged to stand obliquely to a transverse vertical plane.

$K^2$ designates an arm mounted rigidly on the needle-frame K, so as to project rearwardly in position for its end to engage and deflect the blade $l'$ laterally in the downward and rearward movement of the said frame K. The extreme end $k^2$ of said arm $K^2$ is provided with a hook $k^3$, which engages with the rear edge $l^2$ of the blade $l'$ in the return movement of the arm $K^2$ and thus oscillates the lever L and retracts the bolt $D^{15}$, the hooked end of the arm $K^2$ finally slipping off from the end of the blade $l'$ in its further forward movement.

$D^{17}$ is a spring-pressed catch constructed and arranged to engage the bolt $D^{15}$ substantially like the catch $D^{11}$ of the part $D^6$. The catch $D^{17}$ is tripped to release the bolt $D^{15}$ by means of a cam $D^{18}$, keyed upon the shaft $J'$, this tripping action occurring at a time when both the shaft $J'$ and the head D are in rotation, as hereinafter described.

$D^{19}$ designates a second sliding bolt mounted in the head $D^{17}$, parallel with the bolt $D^{15}$ and some distance vertically above the latter. The bolt $D^{19}$ is connected so as to move with the bolt $D^{15}$ conveniently by means of a right-angled integral arm $d^{21}$, which extends through the bolt $D^{15}$, the outer ends of said bolts being coincident in length.

Next, describing the needle mechanism hereinbefore referred to, K designates, as a whole, a swinging frame comprising parallel arms $K^3$ $K^3$, keyed upon a longitudinally-arranged rock-shaft $K^4$, mounted in suitable bearings in the front upper part of the frame A.

$K^5$ designates a horizontal bar carried upon the outer ends of the arms $K^3$, upon which bar are mounted the arms $K'$ and $K^2$, hereinbefore described, and the needle-head M. The rock-shaft $K^4$ is actuated by means of an arm $K^6$, with the end of which is connected the upper end of a pitman $K^7$, having connection at its other end with the wrist $k^4$ of a crank-arm $K^8$, keyed upon the main driving-shaft G. The crank-arm $K^8$ is somewhat shorter than the arm $K^6$, so that the frame K is oscillated through somewhat less than one-half of a complete revolution.

M designates the needle-head as a whole, comprising a yoke-frame having a central body portion $m'$, arms $M^2$ $M^2$, and a connecting-bar $M^3$, extending between the arms $M^2$ $M^2$.

N designates the needle, consisting of an outer tubular part or sleeve $n$ and an inner needle proper, $n'$, mounted to slide in a bore or aperture $m$, extending centrally through the body $M'$ and the bar $M^3$ of the yoke M. A cross-head O is connected with the sleeve part of the needle and is adapted to move said part longitudinally upon the needle proper, as presently to be described.

The needle N is of peculiar construction, the inner member $n'$ being of uniform diameter throughout its main length, provided at its end with a cylindrical enlargement $n^2$, equal in diameter to the external diameter of the tubular part $n$, which part $n^2$ terminates in a conical point $n^3$. The opposite sides of the cylindrical part $n^2$ are cut away or flattened, as at $n^4$ $n^4$, to leave an intervening part $n^6$, equal in thickness to the diameter of the needle $n'$, right-angled shoulders $n^5$ $n^5$ being thereby formed at the juncture of the flattened portions with the conical-point portion $n^3$. The tubular member $n'$ is bifurcated or slotted at its end, so as to fit upon or embrace the flattened part $n^6$ of the cylindrical enlargement $n^2$ and to engage at its extreme end with the shoulders $n^5$ $n^5$. The said tubular part $n$ is held normally in contact with the shoulders $n^5$ $n^5$ by means of a coiled spring $N'$, interposed between the opposite end thereof and the cross-bar $M^3$. In order that the sleeve $n$ may be retracted against the action of said spring $N'$, it is provided with an enlargement or head $n^7$ at its end beyond or back of the cross-head O, through which latter the sleeve extends.

Two independent mechanisms are provided for shifting the cross-head O to retract the sleeve $n$. The first consists of two screw-studs $o$ $o$, inserted transversely through the ends of the cross-head, which are adapted to engage, one with the standard $L^2$ and the other with a similar standard $L^3$ upon the front part of the frame $A^7$, the length of said studs being adjusted to arrest the forward movement of the cross-head just before the needle has reached the end of its forward movement. The other mechanism for retracting the cross-head consists of a lever $O^2$, pivoted between its ends at $o'$ to the upper side of one of the arms $M^2$ of the yoke and connected at one end with the central part of the cross-head O by means of a link $o^2$. The other end of the lever $O^2$ is of double construction, one part, $o^3$, arranged to overlie the other, $o^4$. The upper member $o^3$, which is the longer, is pivotally connected with the member $o^4$ at a point $o^5$ between its ends, the extreme inner end of said part $o^3$ being arranged to extend at one side of the pivot-stud $o'$ in position to engage therewith and hold the part $o^3$ rigid with the part $o^4$ when pressure is brought upon its outer end in a direction to retract the cross-head, but to permit said part to flex or pivot upon the part $o^4$ when acted on from the opposite direction. A spring $o^6$ serves to hold said parts normally in alinement with each other.

$O^3$ designates a rigid hooked arm which rises from the lower front part of the machine-frame in position to engage the end of the lever $O^2$ in the reciprocation of the needle-frame, the arrangement being such that as the needle-head is carried rearward the rounded front side $o^7$ of the part $o^3$ of the lever will engage and slip by the hooked portion $o^7$ of the arm $O^3$, but in the return movement will engage positively therewith and retract the cross-head O and finally slip endwise out of engagement with the hook.

Figure 12:
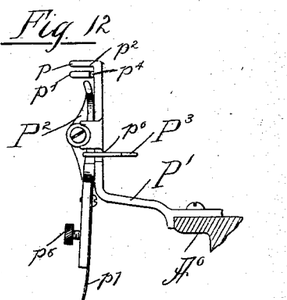
Figure 13:
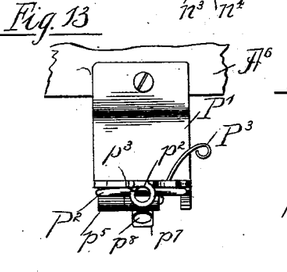
Fig. 13 is a detail of the upper end of the sliding locking-bar and support.

Describing now in detail the tension device P, this is mounted upon a suitable bracket $P'$, extending outwardly and upwardly from the central front part of the main frame $A^6$ near the upper part thereof, as shown more clearly in detail Fig. 12. At the extreme upper end of said bracket $P'$ are mounted two horizontal cut ring-thread guides $p$ $p'$, arranged one directly below the other with a slight space $p^2$ intervening and having their cuts or openings $p^3$ $p^4$ arranged out of register with each other. From the guide-rings the yarn passes beneath a lever-form tension device $P^2$, pivoted upon a side lug $p^5$ on the bracket $P'$ in such manner as to oscillate toward and from the face of said bracket, and between which and said tension-lever the yarn is held.

P³ indicates a guard-arm secured at one end to the outer side of the tension-lever P² and bent to extend first directly outward and then obliquely backward through a horizontal slot or recess P⁶ and some distance beyond or back of the bracket P', the purpose of the arm P³ being to prevent the yarn from being displaced from beneath the tension-lever P² by the rotation of the thread-guide C, while at the same time permitting the tension device to be threaded with facility.

In order that tension may be brought upon the yarn only during that part of the operation of winding the tuft when the binding-coils $x'$ are being formed, the lower end of the tension-lever P² is provided with a depending plate-spring $p^7$, regulable by means of a set-screw $p^8$, which spring is engaged and forced outwardly by a swell or boss $e^3$, secured or formed upon the central part of the outer side of the bar $e'$ of the frame E. This boss is so located that when the frame E is in its normally stationary position with the tubular guide C held in proper relation to the head D the spring $p^7$ will be engaged and forced outwardly in a manner to bring tension on the yarn, but when the said frame is rotating to wind the parallel coils $x$ of the tuft the boss $e^3$ will merely throw the end of the lever outwardly each time it is carried past the same, but will cause no appreciable tension on the yarn.

After the tuft has been completed and severed from the supply end of the yarn it is necessary that it be pushed from the studs $d\ d$ and ejected from the head D, and this is accomplished by means of a sliding ejector-rod Q, mounted to reciprocate in a transverse direction in guide-lugs $q\ q'$, carried by a bracket Q', mounted upon the upper central part of the frame D', the forward end of the rod being arranged to be projected centrally between the studs $d\ d$, and thus eject the tuft. The ejector-rod Q is projected by means of an oscillatory arm Q², keyed upon a horizontal shaft Q³, carried in suitable bearings formed in the upper part of the bracket Q', and a similar bracket O, located near the right-hand end of the frame D', the ejector being connected with the said arm Q² by means of a link Q⁵. The shaft Q³ is oscillated by means of a vertical push-rod Q⁶, connected at its upper end with a second arm Q⁷, keyed upon the shaft Q³ near the right-hand end of the latter, said rod Q⁶ extending down through a guide-thimble Q⁸, provided with a laterally-extending trunnion $q^2$, mounted in a pivot-aperture in the lower part of the cross-frame A⁵ in such manner as to permit the slight oscillatory movement of the rod Q⁶, incident to the reciprocation of the frame D'. The push-rod Q⁶ is raised a short distance and allowed to drop back once during each revolution of the main shaft G by means of a cam-stud $q^3$, mounted in the periphery of the cam-disk G¹³, which stud engages with a spur $q^4$ on the rod Q⁶. The ejector-rod is held normally retracted by means of a coiled contractile spring Q⁹, secured at one end to the arm Q² and at its other to a part of the main frame in rear thereof.

The operation of the machine thus described is as follows: The machine is threaded by placing the spool in position upon the spindle carrying the end of the yarn forwardly out over the end of the guide-bar $b'$, thence down through the guide-rings $p$ and $p'$ through the tension device P and tubular guide C, and finally placing the extreme end of the yarn between the gripping-jaws of the head D. The parts of the machine being in the position shown in the drawings, or that in which the cam-stud $g'$ of the disk G³ is just beginning to oscillate the segment G⁵ toward the front of the machine, the first half-revolution of the main driving-shaft G acts, through the medium of the segment G⁵ and train of gearing driven thereby, to rotate the frame carrying the tubular guide C in its vertical orbit the determined number of revolutions, thereby winding the longitudinal coils of the tuft upon the studs $d\ d$. Meantime, while the longitudinal coils are being wound, the frame D', carrying the head D and studs $d\ d$ thereon, has, through the medium of the cam-disks G¹² and levers D², been gradually reciprocated back and forth a single time, thus distributing the coils evenly upon the studs $d\ d$. As the rotating frame E completes its last revolution the sliding bar H is drawn down, by the engagement therewith of the cam-roller $g^4$, into position to arrest the movement of the said frame E with the tubular guide C, directly opposite the center of the tuft, and with the boss $e^3$ of said frame in engagement with the lower end of the tension-lever P', thereby bringing tension upon the yarn. The further movement of the main shaft G brings the cam-roller $g^4$ and cam-flange $g^5$ into engagement with the arm I' of the rock-shaft I and thus causes the segment I² to rotate the head D upon its own longitudinal axis. Obviously, this will carry the yarn transversely around the middle of the partially-formed tuft. As the head D approaches the end of its first half-revolution the end $d^{15}$ of the lever D⁹ is carried into engagement with the curved cam-surface $d^{16}$ of the cam-finger D¹⁰ and is thereby shifted by said lever so as to retract the gripping-bolt D⁸ and knife D¹³, the former being automatically engaged and held by the catch D¹¹. The retraction of the bolt D⁸ and knife D¹³ leaves the throat $d^5$ open and permits the strand to be drawn through the head snugly around the middle of the tuft. The continued operation of the machine completes the first and second turns around the tuft. As the head D commences its third revolution the cam D¹⁸ trips the spring-catch D¹⁷ and permits the bolt D¹⁵ and parallel smaller bolt D¹⁹, carried thereby, to be projected by the spring $d^7$ and thus close the throat $d^5$.

Figures 6, 7, 8, 16, 17, 18:
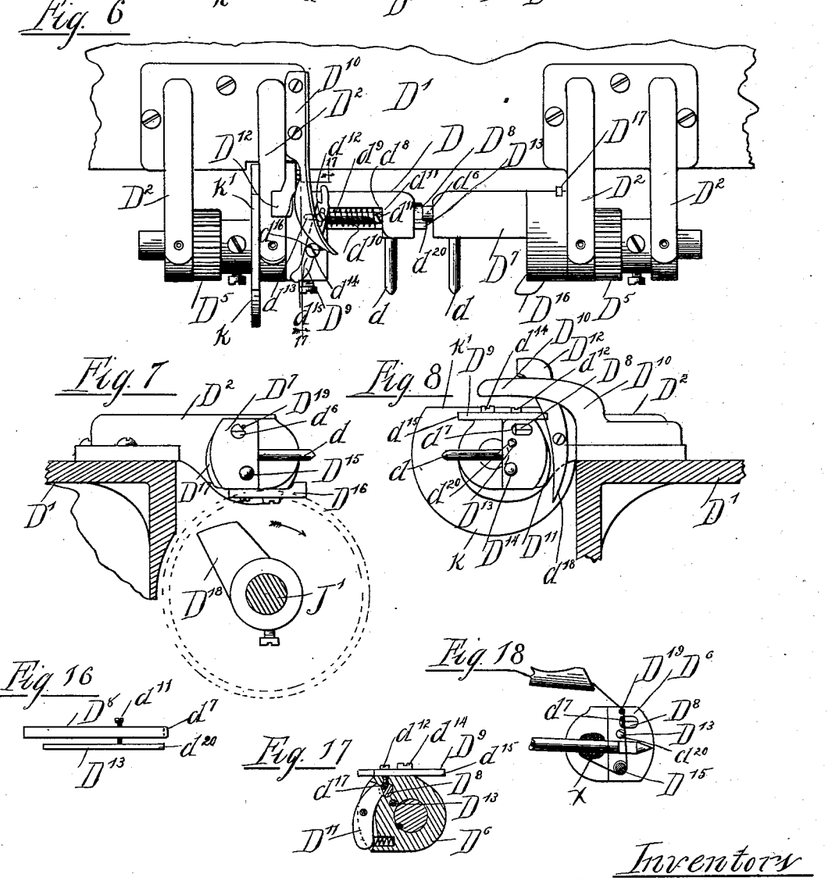
Figure 9:
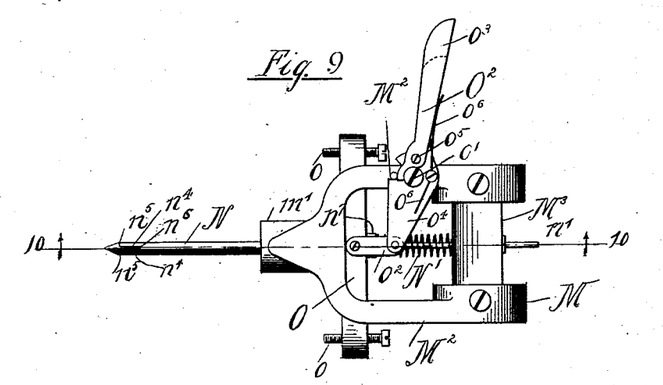
Fig. 9 is a top plan view of the needle-head.
Figure 10:
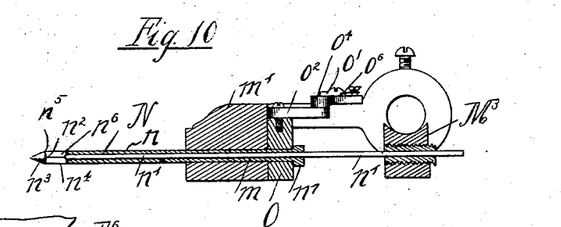
Fig. 10 is a vertical longitudinal section of the same.
Figure 11:
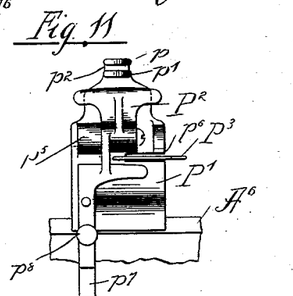
Figs. 11 and 12 are front and side elevations, respectively, of the tension device.

The further rotation of the head carries the last coil of the strand into the position shown in Fig. 18, that is to say, with the yarn extending from the tuft down around and back of the projecting ends of the bolts $D^{15}$ and $D^{19}$ up and alongside of the path of the needle and across the face of the gripping-bolt $D^8$, at this time retracted. As the head reaches this position the arm $I^4$ comes into contact with the stop and arrests the further movement of said head. Meantime the needle-frame has been gradually approaching and the needle is now ready to pierce the center of the tuft. A slight further movement of the machine carries the needle to the position shown in said Fig. 18. As the needle is being forced through the tuft the hook of the arm $K^2$ deflects the blade $l'$ of the lever L and passes beyond the latter. The ends of the studs $o\,o$, by coming into contact with the standards $L^2$, arrest the forward movement of the cross-head O and thus open the needle, as shown. The lever $O^2$ slips by the hook $O^3$ and into position to be reëngaged by the outward movement of the needle-head, and the end of the arm $K'$ engages the tripping-lever $D^{12}$ and releases the gripping-bolt $D^8$ and knife $D^{13}$, connected therewith, thus allowing said bolt $D^8$ to clamp the yarn between its end and the opposing boss $d^6$, and at the same time projecting the blade of the knife immediately in front of the vertical strand of yarn. The return movement of the needle now begins. The first retractive movement of the needle allows the sleeve thereof to clamp the yarn firmly between its end and the shoulder $n^5$ upon whichever side of the needle the yarn happens to pass. Just as this occurs the hooked end of the arm $K^2$ engages and oscillates the bell-crank lever L, which latter retracts the bolts $D^{15}$ and $D^{19}$, thus releasing that part of the yarn held away from the body of the tuft by said bolts. The yarn being now released below the needle, firmly gripped by the latter at a point immediately below the knife and held fast by the gripping-bolt $D^8$ above, the further outward movement of the needle draws the yarn across the knife and severs the tuft from the supply end. The continued outward movement of the needle draws the end of the yarn held thereby through the body of the tuft and draws down the last coil snugly around the middle of the latter, thus completing the tuft. The ejector Q now comes forward and, engaging the finished tuft at its rear side, pushes it off of the studs $d\,d$, and just at the same time the cross-head lever O engages the hook of the standard $O^3$ and opens the needle, so as to allow the tuft to drop into any suitable receptacle or upon the table upon which the machine stands. This finishes one complete cycle of operations of the machine, and the various parts thereof will now have reached the position shown in the drawings and be ready to repeat the operation just described. The succeeding operation will be an exact repetition of the cycle of operation described, each complete revolution of the main driving-shaft making a complete tuft.

While the machine herein described constitutes a preferred embodiment of our invention, yet it is to be understood that it may be embodied in various other forms without departing from the principle of the invention. It will also be obvious that a plurality of sets of tuft-forming devices may be arranged side by side upon the machine shown, this involving a mere duplication of the tuft-forming devices proper, the working machine from which the present drawings were made being in fact such a gang-machine, the requisite additional length being indicated by the interrupted lines of Fig. 1. We do not, therefore, wish to be limited to details of construction, except as made the subject of specific claims.

We claim as our invention—

1. A machine for making tufts from yarn or the like, comprising a holder, mechanism for winding a series of parallel coils thereon, mechanism for winding the yarn transversely upon the parallel coils and mechanism for automatically changing the tension on the yarn when the direction of winding is changed.

2. A machine for making tufts from yarn and the like, comprising a holder, mechanism for winding a series of parallel coils thereon, mechanism for winding the yarn transversely upon the parallel coils, and mechanism for automatically increasing the tension on the yarn during the winding of the transverse coils.

3. In a machine for forming tufts, the combination with a divided holder, the proximate ends of which extend adjacent to each other and act as thread-guides and are normally together, with mechanism for winding a series of coils on said holder in a direction to extend across the line of division thereof, means whereby the divided holder has its parts separated and is then revolved or rotated to wind the yarn transversely around a series of coils, mechanism for severing the tuft from the strand and a needle adapted to pierce the tuft and carry the severed yarn end through the body thereof to draw the last coil taut, substantially as set forth.

4. A machine for making tufts from yarn, or the like, comprising a divided holder, mechanism for winding a series of coils upon the holder so as to extend across the line of division thereof, mechanism for winding the yarn between the two parts of the holder and around the series of coils, automatic thread-engaging devices adapted to engage and hold the yarn away from the body of the tuft, and a reciprocatory needle arranged to pierce the body of the tuft, engage the yarn at a point beyond and draw it through the tuft in its return movement, substantially as set forth.

5. A machine for making tufts from yarn, or the like, comprising a transversely-divided winding-head, skein-holding device carried by said head, a thread-guide arranged adjacent to the skein-holding device, mechanism for rotating said thread-guide in an orbit about the skein-holder so as to wind a skein extending across the line of division of the head, mechanism for revolving said head in a direction transverse to the direction of rotation of the guide in winding the skein, so as to wind the yarn between the winding-heads and about the skein, thread-engaging devices, a thread-cutting device, and a needle adapted to pierce the body of the tuft, engage the thread and draw the severed end through the tuft on its return movement, substantially as set forth.

6. The combination in a machine for making tufts from yarn, or the like, a frame, a two-part separated winding-head mounted in said frame to rotate on its own longitudinal axis, a skein-holding stud arranged to project laterally from each of said parts, a gripping-bolt adapted to engage the thread at a point between the adjacent ends of the separated head, a thread-guide revoluble in an orbit about said skein-holding studs, so as to form a skein thereon extending across the line of separation of the two parts of the head, mechanism for rotating the head on its own axis while said thread-guide is held stationary, mechanism adapted to retract the gripping-bolt to leave the throat-opening between the adjacent ends of the separated head unobstructed, a knife adapted to be projected into the said throat-opening and a needle adapted to pierce the tuft, engage the thread and draw the thread across the knife and through the tuft, substantially as set forth.

7. The combination in a machine for making tufts from yarn, or the like, of a frame, a two-part separated winding-head mounted in said frame to rotate on its own longitudinal axis, a skein-holding stud arranged to project laterally from each of said parts, a gripping-bolt adapted to engage the thread at a point between the adjacent ends of the separated head, a thread-guide revoluble in an orbit about said skein-holding studs, so as to form a skein thereon extending across the line of separation of the two parts of the head, mechanism for rotating the head on its own axis while said thread-guide is held stationary, mechanism adapted to retract the gripping-bolt to leave the throat-opening between the adjacent ends of the separated head unobstructed, a knife adapted to be projected into the said throat-opening and a needle adapted to pierce the tufts, engage the thread and draw the thread across the knife and through the tuft, and means for ejecting the tuft from the head, substantially as set forth.

8. The combination in a machine for making tufts from yarn, or the like, of a frame, a two-part separated winding-head mounted in said frame to rotate on its longitudinal axis, a skein-holding stud arranged to project laterally from each of said parts, a gripping-bolt adapted to engage the thread at a point between the adjacent ends of the separated head, a thread-guide revoluble in an orbit about said skein-holding studs, so as to form a skein thereon extending across the line of separation of the two parts of the head, mechanism for rotating the head on its own axis while said thread-guide is held stationary, mechanism adapted to retract the gripping-bolt to leave the throat-opening between the adjacent ends of the separated head unobstructed, a knife adapted to be projected into the said throat-opening and a needle adapted to pierce the tuft, engage the thread and draw the thread across the knife and through the tuft, means for ejecting the tuft from the head, and means for effecting the release of the yarn from the needle, substantially as set forth.

9. A machine for making tufts from yarn, or the like, comprising a main frame, a secondary frame movably mounted upon the main frame, a winding-head mounted on the secondary frame and provided with skein-holding studs projecting therefrom, a thread-guide mounted to revolve in an orbit about said studs, and means for reciprocating the secondary frame and winding-head mounted thereon in a direction transverse to the plane of the orbit of the thread-guide during the revolution of the latter and means for rotating the winding-head bodily on its own axis, substantially as set forth.

10. A machine for making tufts from yarn, or the like, comprising a main frame, an auxiliary frame mounted to reciprocate upon the main frame, a divided winding-head, provided with skein-holding devices on each side of the point of separation thereof, a thread-guide revoluble in an orbit about the skein-holding device, a stop arranged to arrest the guide in a determined position, means for rotating the head upon its own axis, a tension device arranged to act on the thread during the rotation of the winding-head, and a reciprocating needle adapted to engage and carry the thread through the body of the tuft, substantially as set forth.

11. A machine for making tufts from yarn, or the like, comprising a main frame, an auxiliary frame mounted to reciprocate upon the main frame, a divided winding-head, provided with skein-holding devices upon each side of the point of separation thereof, a thread-guide revoluble in an orbit about the skein-holding devices, a stop arranged to arrest the guide in a determined position, means for rotating the head upon its own axis, a stop arranged to arrest the said head in a determined position, a tension device arranged to act on the thread during the rotation of the winding-head, and a reciprocating needle adapted to engage and carry the thread through the body of the tuft, substantially as set forth.

12. In combination with a tuft-machine, or the like, a two-part needle, the parts of which are movable longitudinally with relation to each other and are provided with opposing shoulders adapted to clamp an interposed thread.

13. In combination with a tuft-machine, or the like, a two-part telescoping needle, provided with opposing shoulders upon the several members adapted to clamp and hold a thread, and a spring acting to force said shoulders yieldingly toward each other, substantially as set forth.

14. In combination with a tuft-machine, or the like, a two-part needle comprising an inner, pointed needle proper and an outer sleeve, opposing shoulders on the respective parts adapted to clamp and hold a thread and a spring arranged to force the shoulder of one part yieldingly toward that of the other, substantially as set forth.

15. In combination with a tuft-machine, or the like, a two-part reciprocatory needle comprising an inner needle proper provided with an enlarged pointed end, a sleeve arranged to slide upon said inner needle and to abut at its end against the enlarged part thereof, and a coiled spring arranged to act upon the sleeve to force it yieldingly toward the said enlargement, substantially as described.

16. In a tuft-forming machine, the combination with winding mechanism adapted to form a tuft, of a two-part reciprocatory needle adapted to engage and pass the yarn through the body of the tuft, comprising an inner needle proper provided with an enlarged pointed end, a sleeve of the same cross-section as the said enlarged end, arranged to slide upon said needle and to abut at its end against said enlargement, a spring arranged to force the sleeve yieldingly toward the point of the needle, and means for retracting the sleeve, substantially as set forth.

17. A machine for making tufts from yarn, or the like, comprising a main frame, a main driving-shaft mounted therein, a winding-frame carrying a thread-guide, driven from said main driving-shaft by connections including an oscillatory segment having ratchet engagement with the connecting mechanism driven by said segment, a winding-head also driven from said main shaft by connections including an oscillatory segment having ratchet engagement with the connecting mechanism driven thereby and a needle reciprocated by means of connections from the main shaft, substantially as set forth.

18. In a machine for making tufts from yarn, or the like, the combination of a frame, a two-part winding-head mounted in said frame to rotate on its longitudinal axis, a skein-holding stud arranged to project laterally from each part of the winding-head, a gripping-bolt adapted to engage the thread at a point between the adjacent ends of the separated head, a cutter-blade movable with the gripping-bolt, a thread-carrier revoluble in an orbit about said skein-holding studs, so as to form a skein thereon, mechanism for rotating the winding-head on its own axis, mechanism adapted to retract the gripping-bolt and cutter-blade to leave the throat-opening between the ends of the cutter-head unobstructed, thread-engaging studs arranged to be projected across said throat-opening to engage and carry the thread into position to be engaged by the gripping-bolt and needle, and a reciprocating needle adapted to transfix the tuft, engage the strand at a point beyond the tuft and in its return movement draw the strand across the knife and the severed end thereof through the body of the tuft, substantially as set forth.

In testimony that we claim the foregoing as our invention we affix our signatures, in presence of two witnesses, this 22d day of June, A. D. 1895.

JONAS SCHUCHAT.
DANIEL G. BUTTS.

Witnesses:
TAYLOR E. BROWN,
WILLIAM L. HALL.